United States Patent [19]

Gould

[11] 4,206,549
[45] Jun. 10, 1980

[54] APPARATUS AND METHOD FOR MAKING OPHTHALMIC DETERMINATIONS

[76] Inventor: Eugene L. Gould, 206 Locust La., Kittanning, Pa. 16201

[21] Appl. No.: 958,121

[22] Filed: Nov. 6, 1978

[51] Int. Cl.² ............................................. A61B 3/10
[52] U.S. Cl. .................................... 33/200; 33/174 A
[58] Field of Search ............ 33/200, 174 A; 356/127; 351/5

[56] References Cited

U.S. PATENT DOCUMENTS

| | | | |
|---|---|---|---|
| 1,052,161 | 2/1913 | Mayerle | 33/200 |
| 1,263,713 | 4/1918 | Smith | 33/200 |
| 1,505,447 | 8/1924 | Uhlemann | 33/200 |
| 1,520,445 | 12/1924 | Rushmer | 33/174 A |
| 1,588,401 | 6/1926 | Fox | 33/200 |
| 1,675,407 | 7/1928 | Dvorine | 33/200 |
| 1,751,425 | 3/1930 | Smith | 33/200 |
| 2,197,139 | 4/1940 | Warner | 33/200 |
| 2,305,059 | 12/1942 | Blocker | 33/200 |
| 2,491,312 | 12/1949 | Henry et al. | 33/200 |
| 2,632,257 | 3/1953 | Belgard | 33/200 |
| 2,884,832 | 5/1959 | Engelman | 33/200 |
| 3,586,448 | 6/1971 | Beasse | 33/200 |
| 4,055,900 | 11/1977 | Grolman et al. | 33/200 |

*Primary Examiner*—Willis Little
*Attorney, Agent, or Firm*—Hymen Diamond

[57] ABSTRACT

A spectacle lense is formed so that its critical center is on the visual axis of the eye of the patient. The point where the visual axis of the eye intersects each lense of a spectacle to accomplish this purpose, is marked on a plane simulated lense of a transparent resilient plastic material. The simulated lense is contoured so that its contour is congruent to the contour of the spectacle lense. A wand is provided for determining the point where the simulated lense is to be marked. The wand includes a transparent plate having a target mark. Magnets are secured to the plate near its periphery. The transparent plate is mounted on the outer surface of the simulated lense with the plate engaging this outer surface and held in slideable engagement by the magnets on the plate and cooperative magnets on the inner surface of the simulated lense. The wand is set to align the target mark with the center of the pupil of the eye. The simulated lense is then marked at the point coincident with the target mark. The simulated lense is then used as a template to form a spectacle lense from a spectacle lense blank so that it has the same contour as the simulated lense and the critical center is in the appropriate position on the spectacle lense.

6 Claims, 12 Drawing Figures

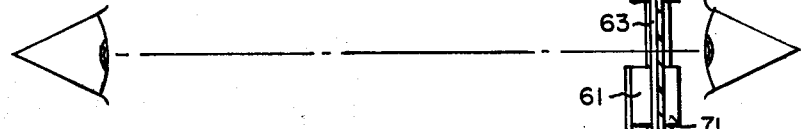
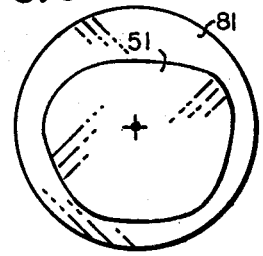
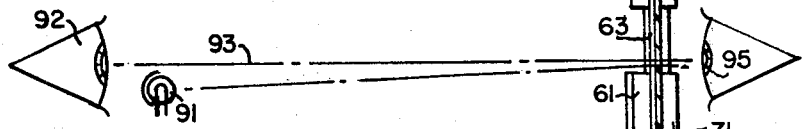
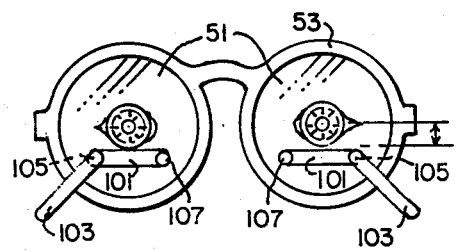
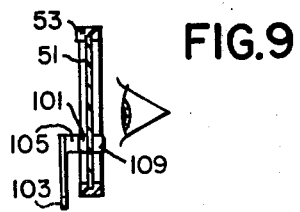

APPARATUS AND METHOD FOR MAKING OPHTHALMIC DETERMINATIONS

REFERENCE TO RELATED DOCUMENTS

1. Leaflet entitled *VARILUX 2 ORMA Technique* issued by Multi-Optics Corporation of 1153 Triton Drive, Suite D, Foster City, Calif. 94404.
2. Leaflet entitled *VARILUX 2 Made Simple* also issued by Multi-Optics Corporation.

BACKGROUND OF THE INVENTION

This invention relates to the ophthalmic art and has particular relationship to the location of the critical center of each spectacle lens relative to the pupils of the patient. In the case of progressive-power lenses the critical center is the point where the progression begins. In the case of some progressive lenses the critical center is the optical center of the lens (Grolman, U.S. Pat. No. 4,055,900).

Spectacle lenses are formed from blanks whose surfaces are ground so that they have the required optical power. These blanks are usually circular and of substantially larger diameter than the largest dimension of a spectacle lens. Typically, a blank may be three inches in diameter. Each blank is provided with a mark defining the critical center point through which the visual axis of the eye should pass. This condition must be met to achieve an accurate centering of the spectacle lenses with respect to the pupils of the patient and their position in the frame. The visual axis is an imaginary line of sight which exits the ocular globe (eyeball) through the center of the pupil. The mark in the blank defines the point through which the visual axis should pass when the line-of-sight of the patient is in the normal primary straight-ahead position (as if both eyes are looking at infinity). The point of intersection is referred to as the point of intersection with the primary plane. The primary plane is a plane surface defined by the contour of the spectacle lens as it exists when mounted in the frame in normal use. For practical purposes, the plane surface may be a plane simulated lens.

In accommodating spectacles to the eyes of a patient, it is essential that after the spectacle lens is formed from the blank, the mark which was on the blank be on the visual axis when the line-of-sight is in the normal primary straight-ahead position. What this requires is that the height of the center of each pupil, in the primary straight-ahead position, above the point on the rim vertically below the center of the pupil must be determined accurately. This determination must be made separately for each eye as the pupils are not always symmetrical with respect to the tip of the nose or the center of the bridge of the nose or situated in the same horizontal plane.

In the case of a single-vision lens, this problem presents no difficulty. The intersection with the visual axis is typically at the optical center of the lens which is usually coincident with the geometric center. For bi-focal or tri-focal lenses which have demarcation lines between the lens sections of different power, the demarcation lines can be used as reference to orient the point of intersection of the lens by the visual axis. This practice has drawbacks, but it has served reasonably. Progressive power lenses have no demarcation lines and present a difficult problem. For progressive-power lenses it is important that the visual axes for both eyes be oriented at the optical threshold where the progressive power begins; i.e., where the power begins to change. As the eyes move together vertically in the progressive pathway, they should look through parts of the lenses of the same progressive power. This condition is governed by the choice of spectacle frame or contour of lenses. Once the frame or contour has been chosen, it must be insured that the respective dimensions of the frame or contour selected allow an accurate centering of the spectacle lenses with respect to the pupils of the patient. This requires that the visual axis pass through the critical center of the spectacle lens. It is an object of this invention to assure an accurate centering of spectacle lens with respect to the pupils of a patient particularly for progressive-power lenses, but also for multi-focal lenses in which there are demarcations between the sections of different power.

In accordance with the teachings of the prior art, the point where the visual axis should intersect the primary plane of progressive-power lenses is determined by manual measurements. The monocular pupilary distance is measured; this is the distance between the tip of the nose or the center of the nose bridge and the pupil in the primary straight-ahead position of the eyes of the patient. A frame or contour is then selected. The distance from the lowest point of the frame or of the periphery of each lens, to the center of the pupil of each eye is measured with the eyes in the straight-ahead position. A correction for distance sight is added. This data is supplied to the ophthalmic laboratory which produces the lenses with the critical center mark of the blank positioned so that visual axis in the primary straight-ahead position passes through this mark.

The above-described prior-art practice has the disadvantages that it is not sufficiently precise. To make the measurements it is necessary that the pupil of each eye be partially obstructed by the scale, or other targeting devices. This militates materially against precision. Another factor is the phenomenon of parallax. By viewing the scale at a slight angle, the reading of a measurement may depart materially from the actual magnitude. In addition, this procedure avails only abstract measurements. There is no concrete structure against which the practitioner or the patient can verify that the visual axis measurements are correct.

The dissatisfaction with the above-described prior-art practice is manifested by the multitude of patents on the same subject. This prior art involves complex and costly measuring mechanisms, most of which intersect the line of sight and obscure part of the pupil, in fact the very point that is to be located.

It is an object of this invention to overcome the deficiencies of the prior art and to provide a relatively simple and uncomplicated apparatus and method for determining accurately the point of a spectacle lens, through which the visual axis should pass, in whose use and practice unobstructed view of the pupils of the patient shall be available and the effect of parallax shall be minimized and that shall also avail a concrete structure enabling the practitioner or patient to verify the visual axis sights.

SUMMARY OF THE INVENTION

According to this invention there is provided for each spectacle lens a plane simulated lens. This lens has the same peripheral contour as the spectacle lens and is composed of transparent resilient material, typically plastic. The plane simulated lens can be cut out of a sheet of plastic, or the like, using the frame or, in the case of a rimless lens, the lens-shape dummy pattern. The plane simulated lens can also be stamped out of a sheet. Where the spectacle has a frame, the simulated lenses are snapped into the grooved eye-wire of the frame. For this purpose the simulated lenses may have a slightly greater contour than the contour of the frame. Where the spectacle is rimless, the simulated lenses may be secured by screws to the mounting brackets which typically hold the spectacle lenses. The simulated lenses in their mountings are fitted to the patient's face. A plate bearing a target mark is mounted on each simulated lens by magnetic clamping means and the target mark is aligned with the center of each pupil which the eyes of the patient in the primary straight-ahead position. The target mark is at the position where the visual axis passes through the simulated lens. Each simulated lens is then provided with a recording mark coincident with the mark on the plate. The plates are then removed and a fluorescent verification spot is applied over the recording mark. The practitioner then sights in the direction of the verification spot to verify if the recording mark is aligned with the center of the pupil, adjustments can be made if necessary. To aid the practitioner, the fluorescent spots can be illuminated. The patient sees colored spots projected into space whose position is along the visual axes. Misalignment of the colored spots in space, as reported by the patient, would indicate that the recording spots are not in the proper position. The frames with the simulated lenses are then sent to the laboratory for spectacle lens fabrication. At the laboratory the simulated lenses serve as templates for forming the spectacle lenses with the critical centers of the spectacle lenses in the same positions, relative to their contours, as the recording marks in the simulated lenses.

BRIEF DESCRIPTION OF THE DRAWING

For a better understanding of this invention, both as to its organization and as to its method of operation, together with additional objects and advantages thereof, reference is made to the following description taken in connection with the accompanying drawing, in which:

FIG. 5 is a view partly in section and partly in end elevation also showing how the wand cooperates with a simulated lens in locating a visual axis;

FIG. 6 is a plan view showing how the simulated lens operates as a template to form a spectacle lens from a lens blank;

FIG. 7 is a view partly in section and partly in end elevation showing a modification of this invention;

FIG. 8 is a view in front elevation of another modification of this invention; and FIG. 9 is a view in end elevation of the apparatus shown in FIG. 8.

DETAILED DESCRIPTION OF INVENTION

Figure 1A:
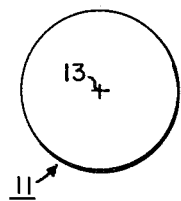
FIGS. 1a, 1b, 1c and 1d are diagrammatic views showing spectacle lenses of different types.

FIGS. 1a through 1d are presented to illustrate different spectacle lenses which are used. Important features of these lenses are shown in color in the center fold of Reference 1 above. As in Reference 1, these lenses are shown as circular in the interest of simplifying the drawing. Actually, the contour of a spectacle lens is curved and tapers slightly from top to bottom.

Figure 1B:
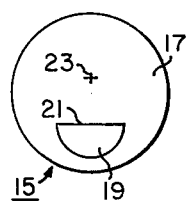
Figure 1C:
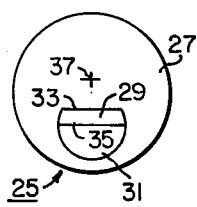

FIG. 1a shows a single vision lens 11. In this case the critical center 13 is at the optical center usually also the geometric center. FIG. 1b shows a bifocal lens 15 having with region 17 containing the distance visual correction and region 19 containing the near point reading correction. Regions 17 and 19 are separated by a demarcation 21. FIG. 1c shows a tri-focal lense 25 having regions 27, 29, 31 of different power separated by demarcations 33 and 35. In the case of the lenses 15 and 25, the lines of demarcation 21 and 33 serve as references for forming the lenses so that the visual axis passes through the critical centers 23 and 37.

Figure 1D:
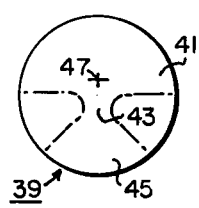

FIG. 1d shows a progressive-power lens 39. The power of this lens 39 varies progressively from a region 41 of distance visual acuity correction through a region 43 of gradually increasing intermediate power to a region 45 of high power, (near point reading power). There are no lines of demarcation in this lens. The critical center 47 is at the point where the progression of the power starts except for lenses made by American Optical Company. In American Optical lenses the critical center is at the "optical" (geometric) center of the lens. The purpose of this invention is to provide apparatus and a method for forming each progressive-power lens 39 so that its critical center is along the visual axis of the eye which it serves. The invention is also applicable to lenses 15 and 25.

In the practice of this invention, plane simulated lenses 51 are provided for each patient. These lenses 51 are contoured to snap into the frames 53 (FIG. 4) selected by the patient or, in the case of rimless spectacles, to meet the desires of the patient.

Figure 2:
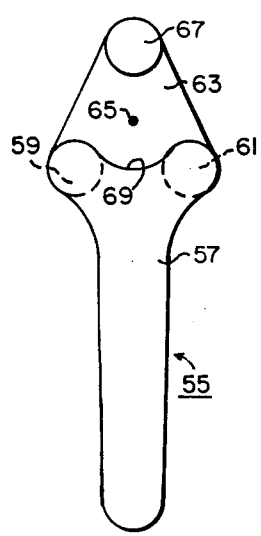
FIG. 2 is a view in front elevation showing a wand for locating the visual axis for a spectacle lens.
Figure 3:
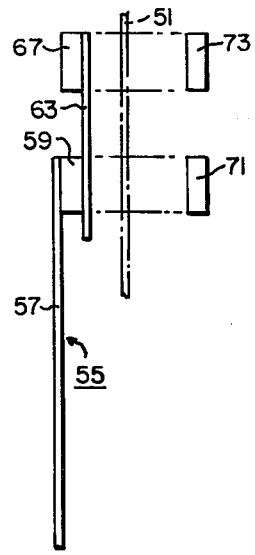
FIG. 3 is an exploded view in end elevation showing the manner in which the wand is movably held on a simulated lens.

There is also provided a wand 55 (FIG. 2). This wand 55 includes a generally T-shaped handle 57. Magnets 59 and 61 are secured near the ends of the cross member of the T. A plate 63 is secured to the magnets 59 and 61. The plate has a target mark 65. The target mark 65 is in a portion of the plate 63 where its view is unobstructed over a substantial area. The plate 63 is shown as of generally triangular shape, but it may take other shapes. A magnet 67 is secured to the plate 63 near its apex. The cross member of the T has a reentrant portion 69 so that the unobstructed area of the plate 63 about the target mark 65 is maximized. A magnet 71, 73 and one not shown is cooperatively associated with each of the magnets 59, 67 and 61 respectively.

Figure 4:
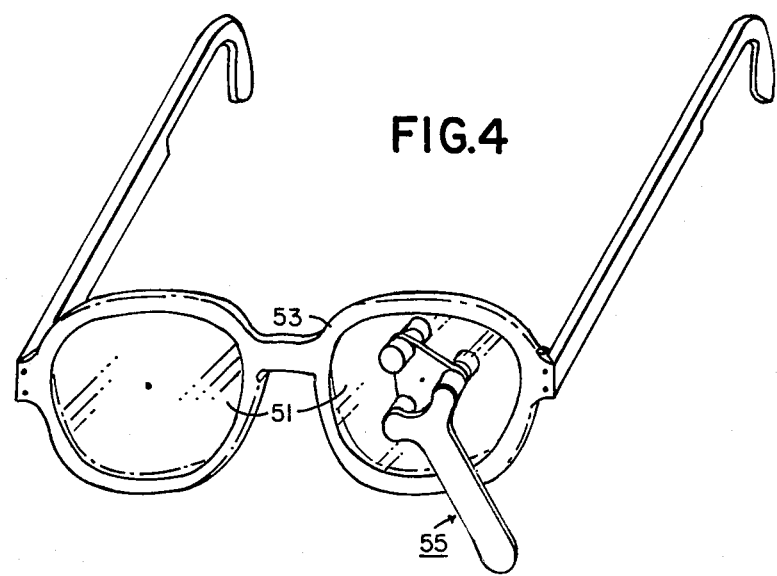
FIG. 4 is an isometric view showing the manner in which the wand cooperates with a simulated lens in locating a visual axis.

The wand 55 serves to locate the point in each simulated lens 51 through which the visual axis passes. The simulated lenses 51 in the frames 53 are fitted to the patient's face in a manner in which they will ultimately be worn. The wand 55 is magnetically clamped on the simulated lens 51 by the mutual magnetic forces exerted by the pairs of magnets 67-71, 67-73 and 59 and the magnet not shown with the plate 63 abutting the outside surface of the simulated lens 51 (FIG. 4). The magnets 71, 73 and the one not shown abut the inside surface of the lens 51. The plate 63 is movable or slideable over the surface of lens 51. The patient sets his eyes in the primary straight-ahead position. By means of the handle 57 the practitioner moves the plate 63, while sighting through the plate on the center of the pupil of the patient, to a position such that the target mark 65 is aligned with the center of the pupil; i.e., is on the visual axis of the eye. The point of the simulated lense coincident with the target mark 65 is then marked with a recording mark on the ocular surface of the simulated lens with an erasable ink. Thereafter, the wand 55 is removed from each of the simulated lenses 51 and the practitioner verifies that the recording mark is in the correct position. For verification that the recording mark in the simulated lens is along the visual axis, a luminous spot may be formed at each recording mark sight by placing a very small spot of luminous or fluorescent paint on the contra-ocular surface of the simulated lense 51 coincident with the recording mark. The practitioner aligns himself before the patient and sights along the luminous spots to determine if the recording marks are aligned with the center of the pupils of the patient in the primary straight-ahead position. For alignment verification utilizing the patient's subjective response, light is projected on the spots from positions at an angle to the visual axes of the simulated lenses. The patient while fixating at infinity sees two colored luminous spots projected out into space and he can inform the practitioner whether to him the marks are properly aligned with the visual axes. The smallest misalignment is readily observed and necessary or desirable adjustments of the position of the recording mark are made. At the final position of the painted mark, a permanent mark is made with a drill. The spectacle frames with the simulated lenses are then sent to the laboratory where the spectacle lenses are produced with the critical centers of the spectacle lenses determined by the permanent marks on the simulated lenses. Typically each simulated lens 51 is placed on a blank 81 (FIG. 6) from which the spectacle lens is formed with the permanent mark coincident with the critical-center mark of the blank 81. The blank 81 is provided with indicia for properly orienting the simulated lens. Each spectacle lens is then blocked up, surfaced and edged so that its contour is congruent with the contour of the simulated lens. A spectacle lens with the critical center in the position where it is intersected by the visual axis is thus formed and when mounted in the patient's frame and fitted on his face, produces a proper critical-center positioning. In this fitting of the spectacles the critical center mimics the site of the permanent mark on the simulated lense 51. The simulated lenses with the permanent mark can be used to verify the critical-mark location on the finished spectacles supplied by the laboratory and the simulated lenses are also filed for record purposes, for example to be used as templates to replace spectacles that are lost or broken.

The apparatus shown in FIG. 7 includes a light source 91, which may be a flashing source. This light source 91 is placed adjacent the eye 92 of the practitioner at a small angle to the line 93 along which the practitioner sights through each plate 63 and simulated lens 51. The light from the source 91 is directed to the pupil of the eye 95 of the patient. Light is normally reflected from the apex of the cornea of the patient. The pupil is located closely behind and central to the corneal apex. The practitioner then adjusts the plate 63 until the target intercepts reflected light pathway so that the light no longer is reflected. The target mark 65 is now aligned along the visual axis, and the simulated lenses may be marked and the spectacle lenses formed as disclosed above.

Where it is desirable that the patient aid in determining the orientation in space of the visual axes, a wand, similar to that disclosed above, but having an opaque plate with a pinhole instead of the transparent plate 63 with target mark 65, may be provided. A wand of this type may be magnetically clamped to the simulated lenses in the frames on the patient. The patient may then sight at an appropriately positioned distance light source or target while adjusting the wands until he sees light or the target through each pinhole. Each pinhole is then along the visual axes and the simulated lenses may be marked.

FIGS. 8 and 9 show apparatus providing a movable simulated segment line for determining the desired vertical separation between the visual axis in the primary straight-forward position of each eye and the uppermost demarcation line of a multi-focal lense. This apparatus includes for each eye an opaque bar 101 having a handle 103. In lieu of the opaque bar 101, a transparent bar with an opaque line or bar on it may be provided. Frames with plane simulated lenses 51 are fitted to the patient. Each bar 101 is magnetically clamped to a simulated lens 51 by pairs of magnets 105 and 107 and 109 and one not shown. The bar serves as a simulated demarcation line. The patient or practitioner may then adjust the position of bar 101 to determine at what vertical height of the multi-focal demarcation line the patient feels most comfortable. The simulated lenses may then be appropriately marked and the multi-focal spectacle lenses formed based on the marking.

While preferred embodiments of this invention have been disclosed herein, many modifications thereof are feasible. This invention is not to be restricted except insofar as is necessitated by the spirit of the prior art. In the claims reference to a mark or a target mark is intended to be taken to mean a mark or target mark of any type including a paint mark, a pinhole, a line or any other form of target.

I claim:

1. Apparatus for determining the position of the critical center of a spectacle lens for a patient with reference to its contour with the aid of a simulated lens of a contour similar to the contour of the spectacle lens, the said apparatus including a plate, a target mark on said plate, magnetic means for clamping said plate movably adjacent to one surface of said simulated lens, and means, connected to said plate, for moving said plate in engagement with said lens while said lens is fitted on said patient, to align the target mark with the pupil of an eye of the patient and thereby determine the point of the spectacle lens through which the visual axis passes thus to set the desired position with reference to the contour of said spectacle lens of the critical center, the said apparatus also including light emitting means for aligning said target mark with the pupil of said patient's eye, said light emitting means to be disposed remotely from said patient substantially aligned horizontally with the eye of said patient so that the light of said light emitting means is normally reflected by the corneal apex of said eye, the reflection being interrupted by said target mark when said target mark is aligned with said pupil.

2. Apparatus for determining the position of the critical center of a spectacle lens for a patient with reference to its contour with the aid of a simulated lens of a contour similar to the contour of the spectacle lens, the said apparatus including a plate, a target mark on said plate, magnetic means for clamping said plate movably adjacent to one surface of said simulated lens, said clamping magnetic means including:

(a) first magnetic means secured to said plate in a position such as to afford a substantial area of unobstructed vision through said plate about said target mark, said first magnetic means to be disposed on one surface of said simulated lens, and (b) second magnetic means to be disposed on the opposite surface of said simulated lens;

said second magnetic means to coact magnetically with said first magnetic means to clamp said plate movably to said simulated lens, said first magnetic means comprising first magnetic block means secured near the periphery of said plate and said second magnetic means including second magnetic block, said second block means being magnetically cooperative with said first block means to clamp said plate to said one surface while, not withstanding such clamping, permitting unrestricted movement of said plate over said surface, and means connected to said plate, for moving said plate in engagement with said lens while said lens is fitted on said patient, to align the target mark with the pupil of an eye of the patient and thereby determine the point of the spectacle lens through which the visual axis passes thus to set the desired position with reference to the contour of said spectacle lens of the critical center.

3. Apparatus for determining the position of the critical center of a spectacle lens for a patient with reference to its contour with the aid of a simulated lens of a contour similar to the contour of the spectacle lens, the said apparatus including a plate, a target mark on said plate, magnetic means for clamping said plate movably adjacent to one surface of said simulated lens, said plate being mounted so that it abuts said one surface of said simulated lens, and means, connected to said plate, for moving said plate in engagement with said lens while said lens is fitted on said patient, to align the target mark with the pupil of an eye of the patient and thereby determine the point of the spectacle lens through which the visual axis passes thus to set the desired position with reference to the contour of said spectacle lens of the critical center.

4. The method of determining the position of the critical center of a spectacle lens for a patient with reference to its contour with apparatus including a plate having a target mark thereon and a simulated lens having a periphery similar to the contour of said spectacle lens, the said method comprising mounting said simulated lens on said patient in the manner of a spectacle lens, with said simulated lens so mounted, mounting said plate on one surface of said simulated lens and moving said plate generally parallel to said simulated lens to align the target mark with the pupil of the patient's eye, marking said simulated lens with a mark aligned with the target mark in said plate when said target mark is aligned with the pupil of said patient's eye, removing the simulated lens from the frame, and with the simulated lens disposed as a template with reference to the lens blank for a spectacle lens, forming the contour of said blank so that it is congruent with the contour of said simulated lens.

5. The method of claim 4 including the steps of impressing the mark on the simulated lens with an erasable impression, adjusting the position of said impression to perfect the alignment of the pupil of the eye of the patient and the mark on said simulated lens, and impressing a permanent mark on said simulated lens in the adjusted position of said mark.

6. The method of claim 4 wherein the plate is moved in abutting engagement with the one surface of the simulated lens.

* * * * *